United States Patent
Chen et al.

(10) Patent No.: US 7,266,359 B2
(45) Date of Patent: Sep. 4, 2007

(54) DC INTERFERENCE REMOVAL IN WIRELESS COMMUNICATIONS

(75) Inventors: Weizhong Chen, Austin, TX (US); Robert Molina, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 346 days.

(21) Appl. No.: 10/963,387

(22) Filed: Oct. 12, 2004

(65) Prior Publication Data

US 2005/0079850 A1   Apr. 14, 2005

(51) Int. Cl.
*H04B 1/10* (2006.01)
*G06F 3/033* (2006.01)

(52) U.S. Cl. .................. 455/296; 455/222; 455/130

(58) Field of Classification Search ............... 455/63.1, 455/67.13, 114.2, 222, 278.1, 296, 234.1, 455/226.1, 226.3, 130; 375/316, 319, 340, 375/345, 346, 148
See application file for complete search history.

(56) References Cited

U.S. PATENT DOCUMENTS

| | | | |
|---|---|---|---|
| 5,748,681 A * | 5/1998 | Comino et al. ............. 375/319 |
| 6,643,336 B1 * | 11/2003 | Hsieh et al. ................ 375/343 |
| 6,717,995 B2 * | 4/2004 | Zvonar ....................... 375/340 |
| 6,844,690 B2 * | 1/2005 | Kalman et al. ............. 318/100 |
| 6,985,711 B2 * | 1/2006 | Holenstein et al. ......... 455/312 |
| 7,035,589 B1 * | 4/2006 | Meng et al. ................ 455/63.1 |
| 7,145,969 B1 * | 12/2006 | Hu et al. ..................... 375/343 |
| 2003/0202618 A1 * | 10/2003 | Jensen et al. ............... 375/319 |
| 2003/0203728 A1 | 10/2003 | Filipovic .................. 455/234.2 |
| 2003/0223479 A1 * | 12/2003 | Mennenga et al. ......... 375/152 |
| 2004/0165687 A1 * | 8/2004 | Webster et al. ............. 375/350 |
| 2005/0084043 A1 * | 4/2005 | Yang et al. ................. 375/346 |

* cited by examiner

*Primary Examiner*—Sonny Trinh
(74) *Attorney, Agent, or Firm*—John A. Fortkort; Fortkort & Houston P.C.

(57) ABSTRACT

A method for removing direct current (DC) interference from a signal received by a communication receiver is provided that removes both a DC offset signal induced by the communication receiver and transmitter. The method includes removing the estimated DC offset from the received signal, correcting a frequency shift in the received signal, estimating a second DC offset signal induced by a source of the received signal, such as a transmitter and removing the estimated second DC offset from the received signal. The receiver DC offset signal is estimated and removed prior to performing a timing carrier offset correction using Barker code manipulation to remove receiver-induced DC offset interference and to sum all Barker chips after effectively multiplying Barker codes to correlate to a Barker sequence unaffected by the receiver DC offset signal.

32 Claims, 5 Drawing Sheets

DC INTERFERENCE REMOVAL IN WIRELESS COMMUNICATIONS

BACKGROUND OF THE INVENTION

1. Field of the Invention

This invention in general relates to communication devices and in particular to receivers and transmitters subject to DC interference.

2. Description of the Related Art

Wireless communication devices proliferating the market place include newer, smaller, more efficient technologies. Wireless telephones are now capable of performing web-enabled services, and packaging for such telephones continues to decrease in size yet have additional user-appreciated functions.

Consumer grade wireless devices have spurred the development of radio frequency electronics with a renewed emphasis on low cost. One receiver architecture which has seen widespread use in consumer wireless devices is referred to as a direct conversion receiver. Direct conversion receivers are simple and inexpensive but tend to have lower performance than the multiple conversion or super heterodyne architectures used in more expensive receivers. One particular problem often associated with direct conversion receivers in the introductions of direct current (DC) offsets in the received signal. Further, low cost transmitters also introduce DC offsets into the transmitted signal. These DC offsets interfere with the desired signal and degrade the receiver performance. Specifically, DC offset can cause adverse impact on user experience in real-time voice application, such as cell-phone voice communication, where retransmissions are not allowed. It is therefore desirable to remove these DC offsets from the desired signal.

Prior art solutions to the DC problems typically only address receiver-induced DC interference. One method of addressing receiver DC interference includes interacting between analog and digital by estimating the DC in digital and removing the DC at analog, where estimating DC interference in the digital domain is based on simple signal summation. Since this simple DC estimation is not accurate, several stages of interaction are needed, which take too much time to converge for real-time voice applications and depends on re-transmission, which, thus reduces the system throughput and increases the latency, thus affects the user experience. Meanwhile, this simple estimation of DC interference in digital domain has low accuracy. This residual DC could create a performance bottleneck for sophisticated data recovery algorithms, which operates after the DC removal. Moreover, in communication systems that operate using bursts of data, time-consuming DC acquisition solutions are frequently impractical because of the limited preamble of the packet.

What is needed is a solution to the DC interference problem for bursty communications systems that does not require retransmissions. Further, a solution that efficiently addresses both transmitter and receiver DC issues without added cost to a system would be especially valuable.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

Figure 1:
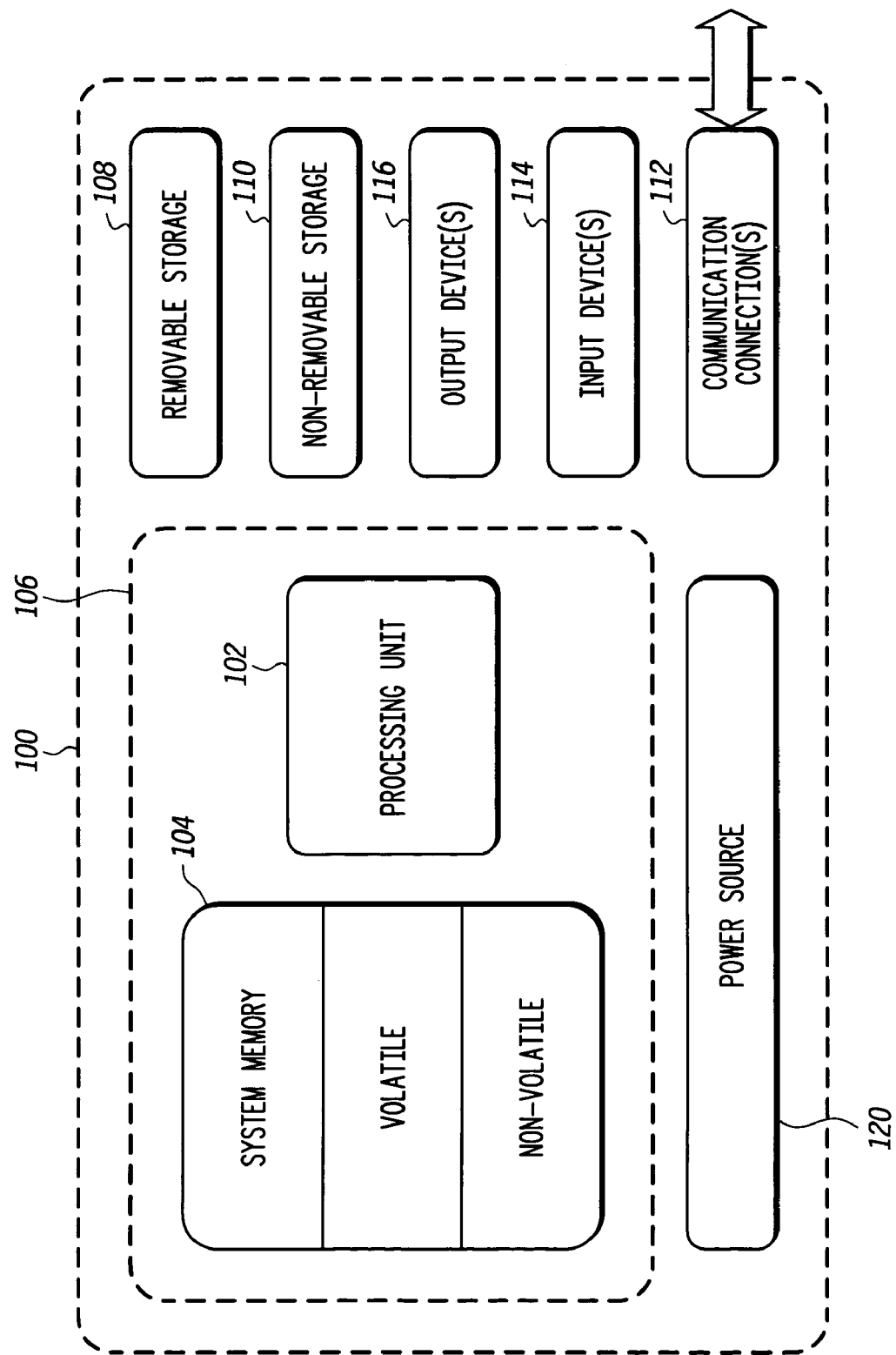
FIG. 1 is a block diagram of a computing and communication device for implementing one or more embodiments of the present invention.

The following sets forth a detailed description of a mode for carrying out the invention. The description is intended to be illustrative of the invention and should not be taken to be limiting.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, such as personal digital assistants (PDAs) and cellular phones, multi-processor systems, microprocessor based or programmable consumer electronics, network PCs, minicomputers, mainframe computers, and the like. The invention may also be practiced in distributed computing environments in which tasks are performed by remote processing devices that are linked through a communications network. In a distributed computing environment, program modules may be located in both local and remote memory storage devices such as application specific integrated circuits (ASICs).

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, cellular phones, personal digital assistants (PDAs), network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may be implemented in a system employing various types of machines, including cell phones, hand-held devices, wireless surveillance devices, microprocessor-based programmable consumer electronics, and the like, using instructions, such as program modules, that are executed by a processor.

FIG. 1 shows an exemplary computing device 100 for implementing one or more embodiments of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 that allow the device to communicate with other devices in a plurality of methods, including those methods that are the subject of the present disclosure. The communications connections 112 can be coupled to many communication media types and devices that communicate either over wired or wireless channels. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

Device 100 may also have one or more input devices 114 such as keyboard, mouse, pen, voice input device, touch-input device, etc. One or more output devices 116 such as a display, speakers, microphone, printer, etc. may also be included. All these devices are well known in the art and need not be discussed at greater length here.

In keeping with the intended application of the invention, device 100 can be configured as a wireless mobile device. To that end, device 100 is provided with a portable power source 120, such as a battery pack, a fuel cell, or the like. The power source 120 provides power for computations and wireless data transmissions by the device 100.

A wireless communication system in accordance with embodiments herein can be implemented as wireless local area networks (WLANs) operating under the IEEE 802.11b specification. More specifically, embodiments are directed to WLANs that receive WLAN 802.11b signals that contain DC interference caused by intermediate frequency (IF) modulation and transmitter generated DC interference. The IEEE 802.11b standard, includes 11 Mbps transmission in the 2.4 GHz band and uses binary phase shift keying (BPSK) for 1.0 Mbps transmissions and quadrature phase shift keying (QPSK) for 2.0, 5.5 and 11.0 Mbps transmissions. Complimentary code keying (CCK) techniques apply to multi-channel operations in the 2.4 GHz band for 5.0 and 11.0 Mbps transmissions. A newer standard, the IEEE 802.11g standard requires orthogonal frequency division multiplexing (OFDM) in the 2.4 GHz frequency band to provide data transmissions at 54 Mbps and is backward compatible to 802.11b networks. IEEE 802.11a also uses OFDM, but in the 5 GHz band.

A signal transmitted according to the IEEE 802.11 family of specifications over a WLAN system, such as an 802.11b system, operates by bursting data in data packets. Specifically, IEEE 802.11b systems send a data packet preceded by approximately 56 or 128 microseconds ($\mu$s) of synchronization preamble. Each wireless device can be allocated 36 $\mu$s for reliably synchronizing a demodulator, leaving 20 us for AGC (Automatic Gain Control) and DC estimation and removal.

Figure 2:
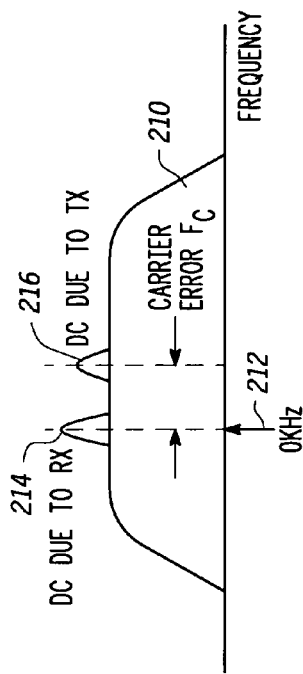
FIG. 2 is a spectrum or amplitude versus frequency graph of a received channel signal in accordance with an embodiment of the present invention.
Figure 2:
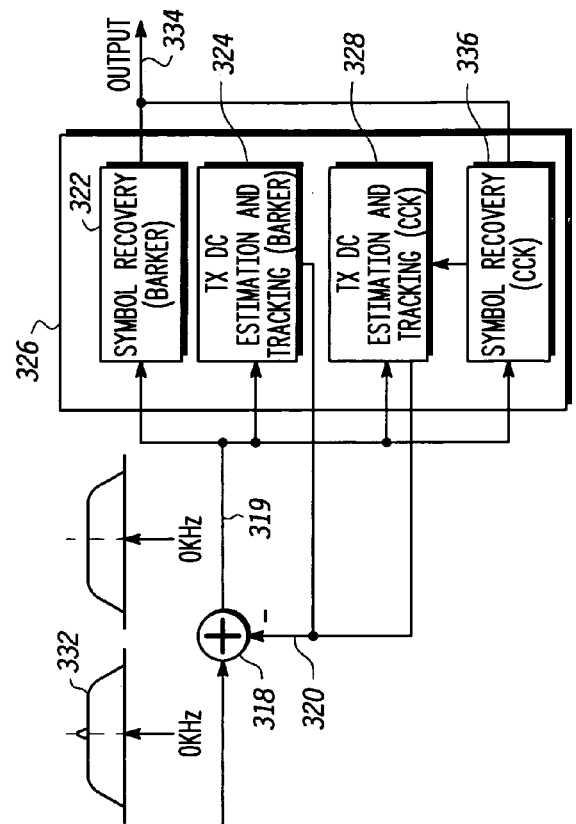

Referring to FIG. 2, the problem presented with 802.11b DC interference removal is illustrated by a spectrum graph illustrating a spectrum 210, with zero kHz 212 identified. The spectrum graph also illustrates two direct current (DC) interfering signals; a DC signal 214 generated by the receiver, and a DC signal 216 generated by a transmitter. The transmitter DC component is generated by non-ideal components in the analog radio frequency section of a transmitter. The non-ideal components generate a signal at the carrier frequency in addition to the desired transmitted signal. The receiver receives the transmitted signal, amplifies this signal, and shifts the received signal in frequency. Ideally, the frequency shift will shift the transmitter carrier frequency to 0 Hz (DC). Practically, however, the frequency references in the transmitter and receiver are not exactly aligned. Thus, the transmitted carrier frequency will not be at DC but will instead be offset by a frequency referred to as the carrier offset ($F_C$). The transmitter DC offset will therefore be shifted to $F_C$, as shown by the dashed line 216 in FIG. 2. The transmitter DC interference has the properties of generally having an amplitude of less than about 17% of signal RMS, offset in frequency by $F_C(t)$ from the receiver DC typically between plus and minus 120 kHz, has the quality of being random in phase between $-\pi$ and $+\pi$, and is slow to change within a burst.

The receiver DC offset is generated by non-ideal aspects of the analog radio frequency electronics. For example, imbalances in mixers that lower the frequency of the received signal will allow local oscillator signals to mix with themselves and generate DC voltages that are not responsive to the received signal. Such factors produce interference at DC as represented by receiver DC interference 214. The receiver DC interference has the property of generally having an amplitude of less than about 35% of the signal root-mean-square (RMS), is random in phase between $-\pi$ and $+\pi$, and has a negligible change within each burst of data. The equation for receiver DC interference is $Ae^{jphi}$.

Figure 3:
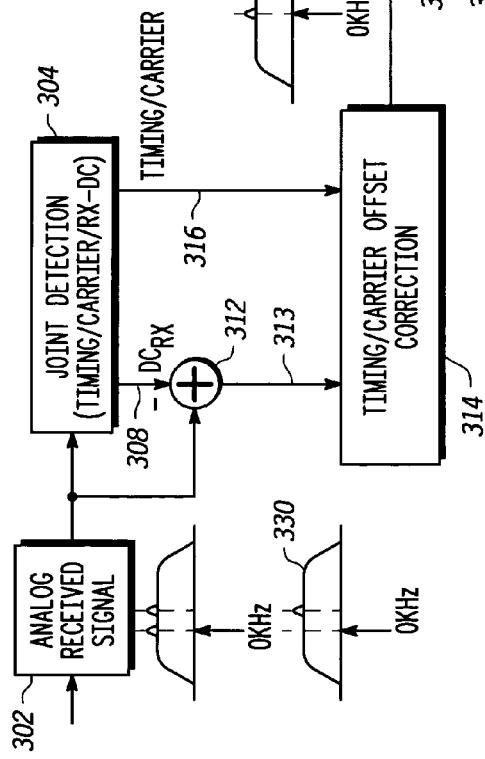
FIG. 3 is a block diagram of an architecture supporting receiver and transmitter DC estimation and removal in accordance with an embodiment of the present invention.

Referring now to FIG. 3, an architecture demonstrates estimating and removing DC interference from a transmitter and receiver. An analog received signal 302 is provided to joint detection block 304 and to summer 312. The received signal 302 includes DC offset interference from the transmitter and DC offset interference from the receiver due to down-conversion to baseband. Joint detection block 304 provides signal 308, which represents an estimate of the DC offset interference caused by the receiver. Joint detection block 304 also provides estimation 316 of the timing parameters of the received signal 302. For example, timing parameters could include chip and symbol boundaries in a CDMA signal. The receiver DC offset interference estimate 308 is subtracted from received signal 302 by summer 312 to produce signal 313, which is provided to timing/carrier offset correction block 314, which also receives timing parameter estimation 316.

The signal 313, which results from subtracting the estimate of the receiver generated DC in summer 312 from received signal 302, more closely resembles the ideal transmitted signal. The resulting spectrum 330 is shown with the receiver induced DC offset removed.

Timing/carrier offset correction block 314 corrects a frequency offset by shifting the frequency of received signal 302 after receiver DC interference at baseband is removed by summer 312. Block 314 provides to summer 318 a signal corrected for receiver local oscillator (LO) frequency offset and corrected for receiver DC offset. Summer 318 also receives feedback 320. Summer 318 removes the estimation of the transmitter-induced DC interference from the frequency corrected signal and produces signal 319. Signal 319 is received by block 326, which represents a transmitter DC drift tracking block and includes transmitter Barker TX DC estimation block 324, Barker symbol recovery block 322, CCK DC TX estimation block 328, and CCK symbol recovery block 336. Barker symbol recovery block 322 receives signal 319 and determines the transmitted symbol by examining the frequency corrected signal with estimated transmitter-induced DC offset interference removed. Transmitter Barker DC estimation block 324 receives the estimated transmitted symbol and the output of summer 318 and produces an estimate of the DC offset interference generated by the transmitter, signal 320 when Barker modulation is in use. CCK symbol recovery block 336 receives signal 319 and determines the transmitted symbol by examining the frequency corrected signal with estimated transmitter-induced DC offset interference removed. CCK TX DC estimation block 328 receives the estimated transmitted symbol and the output of summer 318 and produces an estimate of the DC offset interference generated by the transmitter, signal 320, when CCK modulation is in use.

Figure 4:
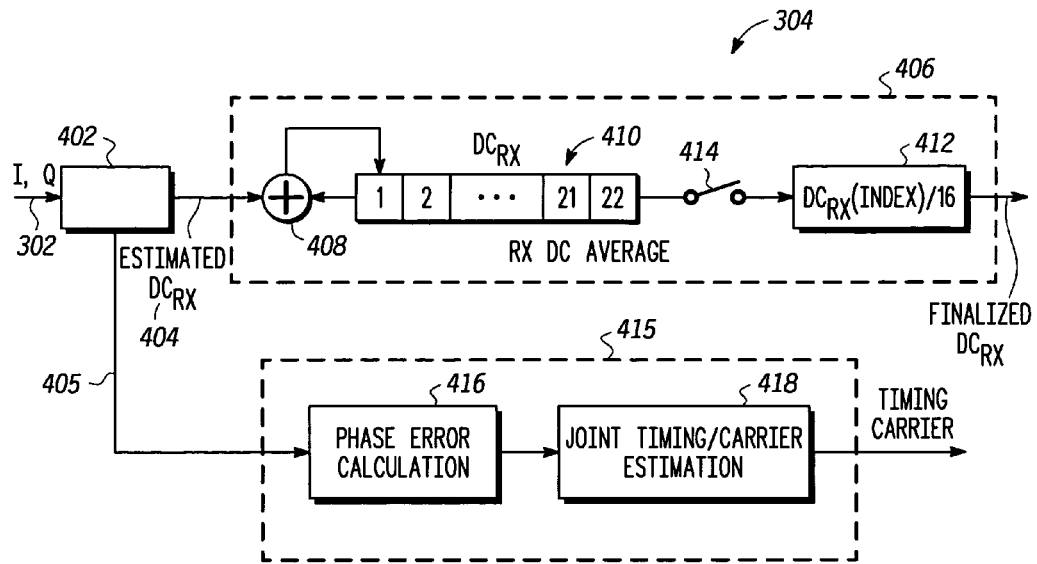
FIG. 4 is a block diagram of a joint detection component within the architecture including timing and carrier estimation and DC estimation components in accordance with an embodiment of the present invention.

Referring now to FIG. 4, joint detection block 304 in FIG. 3 is shown in further detail. More specifically, Barker DC estimation block 402 receives real and quadrature components of the received signal 302 (I,Q). An estimated DC component 404 is then output to Receiver DC Averaging block 406. Receiver DC Averaging block 406 includes a summer 408 that provides the estimated DC signal at the receiver to shift register 410. The previous sample stored in shift register 410 is returned as feedback into summer 408 to form an integrator.

In the example shown in FIG. 4, the sampling rate is (two) samples per chip and each symbol is 11 chips in length. Thus, shift register 410 contains the DC estimates corresponding to 22 samples. The output of shift register 410 is provided to switch 414, which selects one of the 22 DC estimates as a final DC symbol estimate based on a timing decision made by block 415. The DC sum selected by switch 414 is then provided to DC divider 412, which divides the estimated offset by 16. The number 16 represents an estimated DC in the shift register accumulated 16 Barker symbol periods, which can be another number in a different application. The number 16 is referred to herein as an illustration. The effect of the integration and division is to average the DC offset estimated over many symbols to decrease the sensitivity of the offset estimate to noise.

Block 402 also provides a de-spread signal 405 to timing/carrier block 415. Timing/carrier block 415 includes phase error calculation block 416, which is coupled to joint timing/carrier estimation block 418. As shown in FIG. 3, joint detection of timing/carrier with DC estimation block 304 outputs finalized DC signal and timing/carrier signal 316. Timing/carrier signal 316 contains at least a signal which defines the timing of the symbol and chip boundaries of the receive signal.

Figure 5:
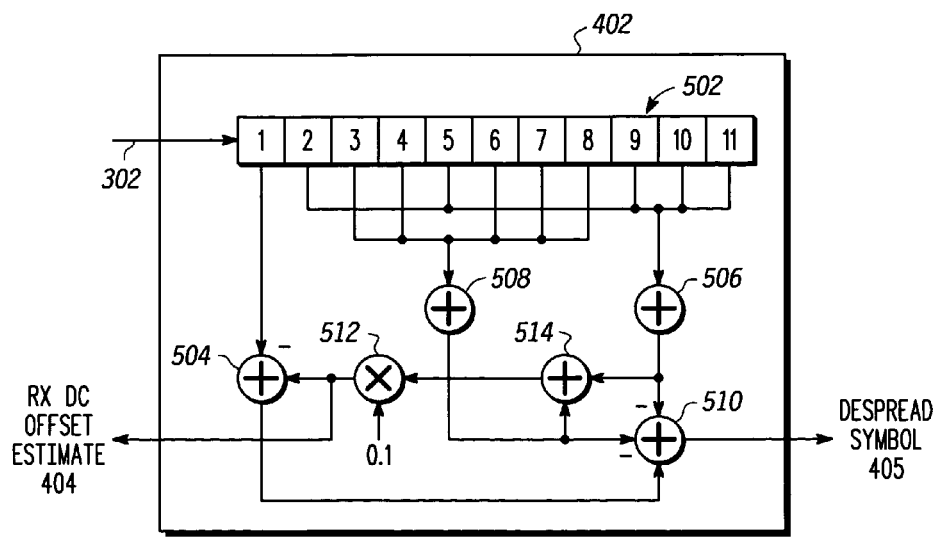
FIG. 5 is a block logic diagram of a Barker code de-spread with DC estimation and removal component in accordance with an embodiment of the present invention.

Referring now to FIG. 5, block 402 in FIG. 4 is explained in further detail in a logic block diagram. FIG. 5 illustrates the Barker code manipulation. Received samples are shown in register 502 corresponding to chips 1 through 11 of the Barker code (1, −1, 1, 1, −1, 1, 1, 1, −1, −1, −1). Each chip is treated as shown, with the first chip entering summer 504. Chips 2, 5, 9, 10 and 11 are added together at summer 506, and chips 3, 4, 6, 7 and 8 are added together at summer 508. Summer 506 operates on elements of the Barker sequence for which the code values are −1. Summer 508 operates on all elements of the Barker sequence for which the code values are +1, with the exception of the first chip.

Register 502 receives signal 302 shown in FIG. 5. Signals 302 are the digital received signal that includes the receiver DC offset, the transmitter DC offset and the desired signal. The nature of the receiver DC offset is such that a fixed DC value is added to each chip stored in shift register 502. The output of summer 508 contains the sum of five chips all of which are 1, and thus produces five times the DC offset and can be represented by X1=5*B+5*DC wherein B represents the signal received when a chip of +1 is transmitted. The output of summer 506 contains the sum of five chips all of which are −1 and 5 times the DC offset and can be represented by X2=−5*B+5*DC. Summer 514 sums the outputs of summer 506 and 508. The output of summer 514 produces X1+X2 or ten times the DC offset. The output of summer 514 is multiplied by 0.1 in multiplier 512, which produces an estimate of the receiver induced DC offset.

Summed chips from summers 506 and 508 are subtracted in summer 510 along with the output of summer 504.

Summer 504 subtracts the DC offset estimate from the value in shift register position 1. Shift register position 1 will contain B+DC and hence the subtraction will produce B. The output of summer 510 produces X1−X2+B which is 11*B. Summing the output of 504, 506, and 508 in this manner removes the receiver DC offset and sums all the chips after effectively multiplying the codes with a value of −1 by −1 and +1 by +1. Thus, summer 510 produces a Barker despread result 405.

The despread result 405 is also shown in FIG. 4 entering block 415. Referring back to FIG. 3, timing/carrier offset correction block 314 adjusts the frequency of signal 313 by carrier offset error $F_C$, which is provided by signal 316. Timing/carrier offset correction block 314 also shifts the sample timing of signal 313 to facilitate symbol recovery. Shifting the frequency of signal 313 results in the transmitter DC offset being moved to DC as shown in spectrum 332. Block 326 performs symbol recovery and DC offset estimation for the transmitter.

Figure 6:
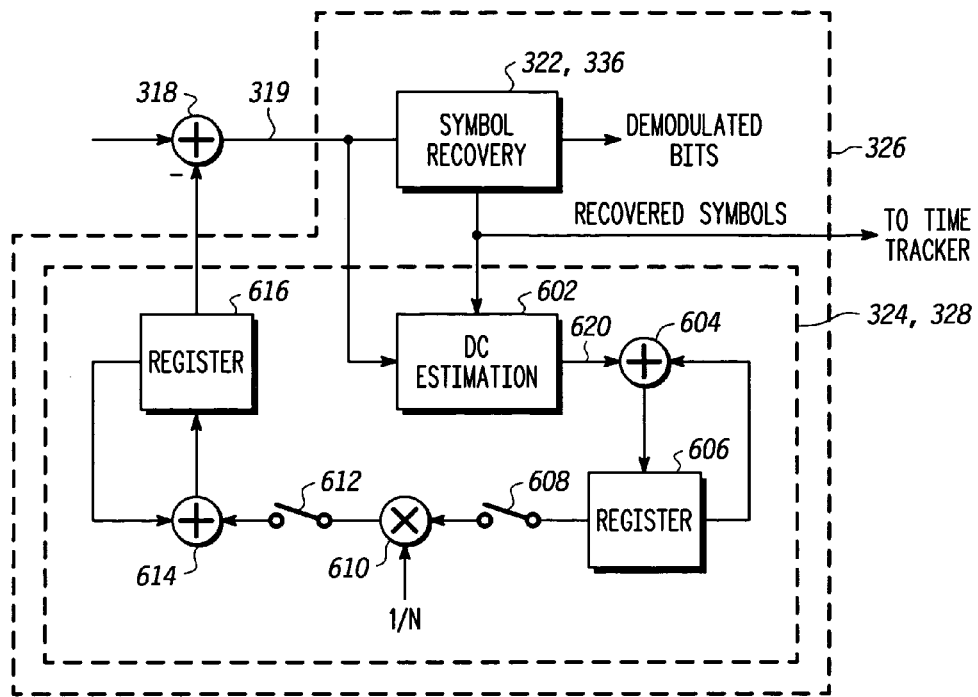
FIG. 6 is a block logic diagram illustrating transmitter DC drift tracking in accordance with an embodiment of the present invention.

Portions of block 326 in FIG. 3 related to DC estimation of Barker spread sequences are shown in FIG. 6. For a Barker implementation, DC estimation block 602 is coupled to symbol recovery block 322 and estimates the DC offset of each symbol using signal 319, representing a chip sequence with a residual transmitter DC offset.

Figure 7:
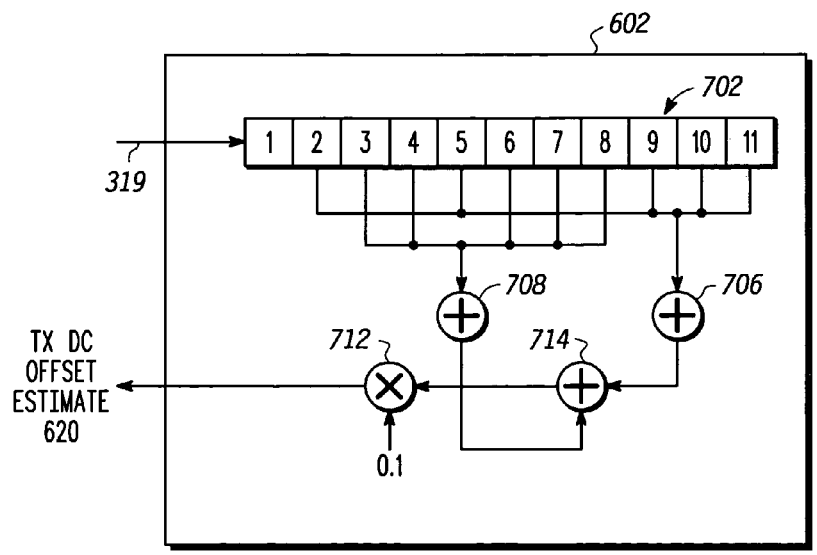
FIG. 7 is a reduced version of the block logic diagram shown in FIG. 5 illustrating a Barker implementation in accordance with an embodiment of the present invention.

Referring now to FIG. 7, a reduced version of FIG. 5 is shown to emphasize the DC tracking loop. More particularly, FIG. 7 receives signal 319, the chip sequence with a residual transmitter DC offset and loads register 702 and provides an output 620. FIG. 7 illustrates that chips 2, 5, 9, 10 and 11 are added together at summer 706, and chips 3, 4, 6, 7 and 8 are added together at summer 708. Summer 708 operates on all elements of the Barker sequence for which the code values are +1. Summer 706 operates on elements of the Barker sequence for which the code values are −1. Register 702 receives signal 319 shown in FIG. 3. The output of summer 708 contains the sum of five chips all of which are 1 and 5 times the DC offset and can be represented by X1=5*B+5*DC wherein B is the signal received when a chip of +1 is transmitted. The output of summer 706 contains the sum of five chips all of which are −1 and 5 times the DC offset and can be represented by X2=−5*B+5*DC. Summer 714 sums the outputs of summer 706 and 708. The output of summer 714 produces X1+X2 or ten times the DC offset. The output of summer 714 is multiplied by 0.1 in multiplier 712, which produces an estimate of the receiver induced DC offset and is shown in FIG. 6 as signal 620.

Output 620 represents the DC offset estimate that is supplied to summer 604 in FIG. 6 and operates with register 606 to accumulate the DC offset estimates produced by block 602 over a symbol. The register 606 holds the accumulation over N symbols. The multiplier 610 multiplies by 1/N to average the sum and produce an averaged DC offset estimate. The output of switch 612 is provided to summer 614 to update register 616. Summer 614 and register 616 are to update the DC estimate for correction of the DC offset estimate. The output of 616 is then provided to the subtractor 318 to complete a DC tracking loop. Signal 319 thus has the transmitter DC offset substantially removed. The DC estimation 602 produces an estimate of a residual DC offset and drives the accumulator formed by 604 and 606, and residual DC update components 614 and 616 in the amount necessary to cancel the residual DC offset.

Complementary Code Keying

The 802.11b physical layer protocol includes a second spreading code referred to as complementary code keying (CCK). CCK sequences are used to achieve the higher data rates of 5.5 and 11 Mb/s. The Barker spreading sequence uses the same code for every symbol. CCK sequences do not use the same code for every symbol. Rather, CCK sequences provide for sending different codes to transfer different bit patterns. The 11 Mb/s data rate is achieved using one of 256 CCK codes which each represent a unique eight bit pattern. Therefore, eight bits are transmitted in each symbol. A 5.5 Mb/s rate is achieved by sending 4 bits in each symbol and, therefore, 16 codes are required. The 16 codes used at 5.5 Mb/s are a subset of the 256 codes used at 11 Mb/s.

There is only one Barker code used in 802.11b and, therefore, a sum of the spreading sequence will always be +1. This is not true when CCK codes are used. First, CCK codes are complex, containing both a real and an imaginary part. The sum of these codes is always one of the nine values 0, +/−2+/−2j, +/−4, and +/−4j. According to an embodiment, the DC offset is estimated using a different method, which is a function of the sum of the CCK code. In general, summing the chips of a CCK symbol, shown in equation 1 provides three groups of cases.

$$\sum_{k=1}^{8} S_k \qquad \text{Eqn. 1}$$

Equation 1 will sum to zero in 48/256 cases. This group will hereinafter be referred to as Group 1. In 160/256 cases, equation 1 will sum to {+2+2j, −2−2j, −2+2j, +2−2j} hereinafter referred to as Group 2. In another 48/256 cases, equation 1 will sum to {+4, −4+4j, −4j}, hereinafter be referred to as Group 3.

It is not possible to know which group an incoming symbol belongs to without examining the remodulated symbol. According to an embodiment, a remodulator is used to recreate an estimate of the sent signal S: S={s1, s2, s3, s4, s5, s6, s7, s8}. Incoming symbols are identified as belonging to one of either Group 1, 2 or 3. Next, the DC component for the symbols and the identified group is isolated.

First, consider the case in which the CCK code sums to 0, Group 1. If the sampled received chips are represented by $r_i$, then the summation of the chips in the presence of a DC offset and noise is:

$$\sum_{k=1}^{8} r_k = 0 + n' + 8DC = 8*DC + n' \qquad \text{Eqn. 2}$$

Therefore, to determine the DC component in the case in which the chips in a symbol sum to 0, the DC offset is estimated by summing samples of the eight chips in a symbol and dividing by eight.

Group 2 occurs when the sum of the chips is 2+2j, 2−2j, −2+2j or −2−2j. Since the sum of CCK codes is always one of the nine values 0, +/−2, +/−2j, +/−4, and +/−4j, and the receipt of 2+2j, 2−2j, −2+2j or −2−2j does not match any of the nine values, Group 2 necessarily includes symbols with an unmatched real pair and an unmatched imaginary pair. Thus, an unmatched pair of symbols is a pair that does not cancel to an accepted CCK code. Because the transmitted chips of the symbols do not add to zero, adding the chips together does not yield a DC component. According to an embodiment, a pair of real chips, {1, −1} is paired with a pair of imaginary chips {j, −j} to enable canceling of symbol information without impairing DC component information.

The sum of these four out of the eight chips sums to $4*DC+n'$. The DC offset can then be estimated by dividing the summation so formed by four. Thus, according to a method Group 2 type information is manipulated by collecting pairs of chips, organizing the chips by separating real from imaginary pairs, for those chips that do not cancel out, performing a subtraction operation, and for those chips that do cancel out, performing an addition operation. Thus, for those chips that sum to $2+2j$, for example, the received symbol information is: $S=[(+j, +j)(+j, -j)(+1, +1)(+1, -1)]$. Subtracting the chips that do not cancel out, $(+j, +j)$ and $(+1, +1)$, results in zeroing out the DC component. Adding the chips that cancel out results in doubling the DC component. Therefore, the DC component can be determined by dividing by two. This embodiment discovers the DC component attributable only for those chips that can be added and ignores the DC component attributed to chips that are not considered. Also, a search can be performed to determine which chips provide useful information.

Another embodiment for Group 2 is formed by first noting that transmitted symbols summing to $2+2j$ or $-2-2j$ are permutations of the paired chips from the set $S=[(+1, +j)(+1, +j)(+1, +j)(-1, -j)]$, or $S=[(-1, -j)(-1, -j)(+1, +j)(-1, -j)]$, respectively.

For $(+1, +j)$, an embodiment directs letting the received chips be represented by $(r1, r2)$ where $r1=Ae^{j\omega}+DC$ and $r2=jAe^{j\omega}+DC$. The noise in the received signals is ignored for simplicity.

According to an embodiment, DC components are isolated by multiplying $r1$ by $-j$ and adding the resultant product to $r2$ gives:

$$-j*r1+r2=-jAe^{j\omega}+j*DC+jAe^{j\omega}+DC=-j*DC+DC \quad \text{Eqn. 3}$$

The channel changes the magnitude and phase of the transmitted signal from $1$, $j$, $-1$, or $-j$ into $Ae^{j\omega}$, $jAe^{j\omega}$, $-Ae^{j\omega}$, $-jAe^{j\omega}$ which enables cancellation of the effects of the transmitted signal from the DC components. Thus, manipulating the received signal to take the combine DC terms results in:

$$r1+j*r2=j*DC+DC \quad \text{Eqn. 4}$$

To remove the DC component dependence on received signal, equations 3 and 4 are added to provide:

$$2*DC=(r1+r2)+j*(r2-r1) \quad \text{Eqn. 5}$$

For both the $(+1, +j)$ and the $(-1, -j)$ cases, the same equation results when the real component is multiplied by $-j$, thereby allowing DC collection regardless of position within the symbol.

For the cases of $2-2j$ and $-2+2j$, the possible received symbols are: $S=[(+1, -j),(+1, -j),(+1, -j)(-1, +j)]$ or $S=[(-1, +j)(-1, +j)(+1, -j)(-1, +j)]$.

For $(+1, -j)$, the received signal including channel effects can be represented by:

$$r1=Ae^{j\omega}+DC \text{ and } r2=-jAe^{j\omega}+DC.$$

Multiplying $r1$ by $j$ and adding the resultant product to $r2$ gives:

$$j*r1+r2=j*DC+DC \quad \text{Eqn. 6}$$

The equations can be manipulated similarly as:

$$r1-jr2=-j*DC+DC \quad \text{Eqn. 7}$$

Adding Equations 6 and 7 yields:

$$2*DC=(r1+r2)+j*(r1-r2) \quad \text{Eqn. 8}$$

Similarly, for $(-1, +j)$, the same equation is achieved by multiplying the real component by $+j$ and combining terms.

The above methods provide the basis for using two equations to represent four cases, with $(2, +2j)$ and $(-2-2j)$ being represented by Equation 5 and $(2-2j)$ and $(-2 +2j)$ being represented by Equation 8.

For the case where the sum is $(2+2j)$ or $(-2-2j)$, we use Equation 5. From Equation 5, $2*dc=(r1+r2)+j(r2-r1)$ for all $r1$ resulting from a sent chip $\{1, -1\}$ and $r2$ resulting from a sent chip $\{j, -j\}$. Thus, if the sum of the remodulated symbols yields $(2+2j)$ or $(-2-2j)$, we know that the first part of the DC is $\frac{1}{8}(\Sigma r1+\Sigma r2)$. Breaking the received chips up into their real and imaginary parts, we have $r1=a1+jb1$ and $r2=a2+jb2$. This yields the first part of the DC component:

$$\tfrac{1}{8}(\Sigma r1+\Sigma r2)=\tfrac{1}{8}[(\Sigma a1+\Sigma a2)+j(\Sigma b1+\Sigma b2)]$$

Likewise, from equation 5 we know that the second part of the DC is $\frac{1}{8}(\Sigma r2-\Sigma r1)$. Again, breaking the received chips up into their real and imaginary parts yields $r1=a1+jb1$ and $r2=a2+jb2$. This yields the second part of the DC component:

$$\tfrac{1}{8}j(\Sigma r2-\Sigma r1)=\tfrac{1}{8}[(\Sigma b1-\Sigma b2)+j(\Sigma a2-\Sigma a1)]$$

Combining the two provides:

$$dc=\tfrac{1}{8}[(\Sigma a1+\Sigma a2+\Sigma b1-\Sigma b2)+j(\Sigma b1+\Sigma b2+\Sigma a2-\Sigma a1)]$$

Thus, for symbols where the sum is $(+2+2j)$ or $(-2-2j)$, the real and imaginary parts of the DC are found as:

Real part: the real part of the sent reals (a1's) plus the real part of the sent imaginaries (a2's) plus the imaginary part of the sent reals (b1's) minus the imaginary part of the sent imaginaries (b2's)

Imaginary part: the imaginary part of the sent reals (b1's) plus the imaginary part of the sent imaginaries (b2's) plus the real part of the sent imaginaries (a2's) minus the real part of the sent reals (a1's)

For the case in which the sum is $(2-2j)$ or $(-2+2j)$, Equation 8 applies. From Equation 8, $2*DC=(r1+r2)+j(r1-r2)$ for all $r1$ resulting from a sent chip $\{1, -1\}$ and $r2$ resulting from a sent chip $\{j, -j\}$. Thus, if the sum of the remodulated symbols yields $(2-2j)$ or $(-2+2j)$, it is known that the first part of the DC is $\frac{1}{8}(\Sigma r1+\Sigma r2)$. Breaking the received chips up into their real and imaginary parts gives $r1=a1+jb1$ and $r2=a2+jb2$. This yields the first part of the DC component:

$$\tfrac{1}{8}(\Sigma r1+\Sigma r2)=\tfrac{1}{8}[(\Sigma a1+\Sigma a2)+j(\Sigma b1+\Sigma b2)]$$

Likewise, from Equation 8 it is known that the second part of the DC is $\frac{1}{8}(\Sigma r1-\Sigma r2)$. Again, breaking the received chips up into their real and imaginary parts gives $r1=a1+jb1$ and $r2=a2+jb2$. This yields the second part of the DC component:

$$\tfrac{1}{8}j(\Sigma r1-\Sigma r2)=\tfrac{1}{8}[(\Sigma b2-\Sigma b1)+j(\Sigma a1-\Sigma a2)]$$

Combining the two gives:

$$dc=\tfrac{1}{8}[(\Sigma a1+\Sigma a2+\Sigma b2-\Sigma b1)+j(\Sigma b1+\Sigma b2+\Sigma a1-\Sigma a2)]$$

Thus, for symbols for which the sum is $(2-2j)$ or $(-2+2j)$ the real and imaginary parts of the DC are found as follows:

Real part: the real part of the sent reals (a1's) plus the real part of the sent imaginaries (a2's) plus the imaginary part of the sent imaginaries (b2's) minus the imaginary part of the sent reals (b1's)

Imaginary part: the imaginary part of the sent reals (b1's) plus the imaginary part of the sent imaginaries (b2's) plus the real part of the sent reals (a1's) minus the real part of the sent imaginaries (a2's)

Figure 8:
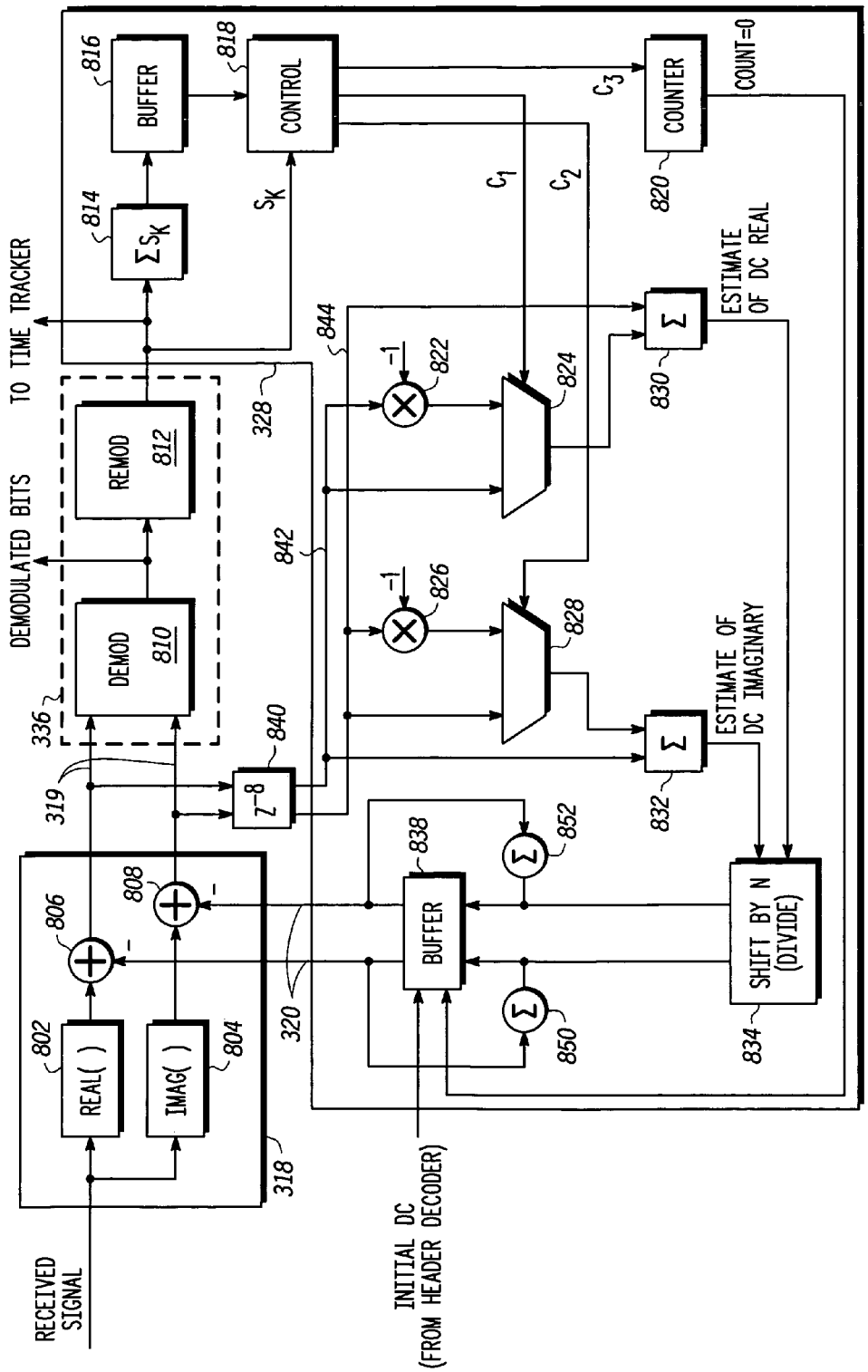
FIG. 8 is a block diagram illustrating the use of complementary code keying (CCK) in accordance with an embodiment of the present invention.

Referring now to FIG. 8, a block diagram illustrates a detailed embodiment of block 326 of FIG. 3 for a CCK implementation and shows summer 318 is shown in further detail. Summer 318 is an implementation of a complex summer. Summer 318 consists of block 802 which extracts the real portion of the input and block 804 which extracts the imaginary portion. The real portion signal 320 is subtracted from the real portion of the received signal extracted by block 802 in summer 806 and the imaginary portion signal 320 is subtracted from the imaginary portion of the received signal extracted by block 802 in summer 808. Note that signal 320 is shown as separate real and imaginary portions for clarity but is equivalent to signal 320 shown in FIG. 3 which a complex signal represented by a signal element.

CCK symbol recovery 336 consists of Demodulator 810 and Remodulator 812. Demodulator 810 converts the received signal to a bit stream. Remodulator 812 converts this bit stream into the chip sequence transmitted.

CCK transmitter (TX) DC estimation block 328 in FIG. 3 is described in further detail in the following. Summer 814 sums the eight chips from the symbol to allow a determination of whether the symbol belongs to Groups 1, 2, or 3. Buffer 816 delays the signal to align the control signals generated in control 818 to align with the received data in later stages. Control block 818 produces control bits c1, c2, and c3 as shown in the below Table 1 for control of (c1 c2 and c3):

TABLE 1

| | | | |
|---|---|---|---|
| $\Sigma S_k = 0$ | | 001 | $8*DC = r1 + r2 + r3 + r4 + r5 + r6 + r7 + r8$ |
| $\Sigma S_k = 2 + 2j$ or $-2 - 2j$ | $S_k$, real | 011 | Equation 5 applies |
| $\Sigma S_k = 2 + 2j$ or $-2 - 2j$ | $S_k$, imaginary | 101 | Equation 5 applies |
| $\Sigma S_k = 2 - 2j$ or $-2 + 2j$ | $S_k$, real | 101 | Equation 7 applies |
| $\Sigma S_k = 2 - 2j$ or $-2 + 2j$ | $S_k$, imaginary | 011 | Equation 7 applies |
| $\Sigma S_k = 4$, or $-4$ or $4j$ or $-4j$ | | xx0 | Ignore |

The output of summers 806 and 808 are delayed in delay register 840 such that the data will align with the control signals produced by control 818 and ultimately with the received signal. The delayed real portion of the signal 842 produced by 840 is fed to multiplexer 824 and multiplier 822. Multiplier 822 multiplies the signal 842 by −1 and then feeds the other input of multiplexer 824. Therefore, multiplexer 824 will select signal 842 when control c2 is a 1 or will select the negative of signal 842 when control c2 is a 0. The delayed imaginary portion of the signal 844 feeds multiplexer 828 and multiplier 826. Multiplier 826 multiplies signal 844 by −1 and feeds the other side of multiplexer 828.

The output of multiplexer 824 and signal 844 feed summer 830 which forms the sum of these two signals over the 8 chips in a symbol. Similarly, signal 842 and the output of multiplexer 828 are summed in summer 832 over the eight chips in a symbol.

The values of C1 and C2 shown in Table 1 will result in summers 830 and 832 implementing the summations given in Equations 8, 9 and 10 when the summation of $S_k$ is 0, 2+2j or −2−2j, −2+2j or 2−2j respectively.

The outputs of summers 830 and 832 are divided by 8 in shifter 834. The outputs of shifter 834 are provided to summers 850 and 852 where the prior DC offset is fed back and added to the outputs of shifter 834. The summed values are then provided to buffer 838.

Buffer 838 is initially loaded with the value of the DC offset estimated during the Barker sequence. Recall that a header with Barker modulation is present in every 802.11 burst, and therefore, an initial estimate will always be present from this Barker sequence. Once the CCK sequence begins, buffer 838 is loaded with the estimated DC offset every time the counter wraps to zero. This only occurs when the counter is enabled by c3 in Table 1, being a 1. Thus, when the summation of summer 814 is a 4, −4, 4j, or −4j the buffer is not loaded and these cases are effectively ignored.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for removing direct current (DC) interference from one or more signals received by a communication receiver, the method comprising:
   estimating a DC offset signal induced by the communication receiver;
   removing the estimated DC offset from the received signal;
   correcting a frequency shift in the received signal;
   estimating a second DC offset signal induced by a source of the received signal;
   removing the estimated second DC offset from the received signal; and
   tracking a residual DC offset by the source of the received signal by (a) receiving DC offset estimates produced over a symbol, (b) accumulating a plurality of DC offset estimates produced over N symbols, (c) averaging the accumulated DC offset estimates to produce an averaged DC offset estimate, and (d) updating the received DC offset estimates using the averaged DC offset estimate.

2. The method of claim 1 wherein the DC offset estimate is supplied to first summer, the first summer operating with a register to accumulate the DC offset estimates produced over N symbols.

3. The method of claim 1 wherein the averaging is performed by dividing the accumulated DC offset estimates by the number of symbols accumulated to determine the average DC offset estimate.

4. The method of claim 1 wherein the updating includes:
   receiving the averaged DC offset estimate;
   accumulating the averaged DC offset estimate in a register; and
   providing the accumulated averaged DC offset estimate to a subtractor to complete a DC tracking loop.

5. The method of claim 1 wherein the estimating the DC offset signal includes:
   determining at least one sum of the received signal; and
   applying one or more functions to estimate the DC offset, the functions selected according to predetermined criteria and the sums of the received signals.

6. The method of claim 1 wherein the source of the received signal is a transmitter.

7. The method of claim 1 wherein the receiver DC offset signal is estimated and removed prior to performing a timing and carrier offset correction.

8. The method of claim 1 wherein the receiver DC offset signal is estimated and removed using Barker code manipulation to remove receiver-induced DC offset interference.

9. The method of claim 1 wherein the DC offset signal is estimated by rearranging received Barker signals to separate the estimated DC signal from a de-spread Barker output.

10. A method for removing direct current (DC) interference from a received signal, the method comprising:

operating on an equal number of positive and negative Barker chips to determine a sum of the DC offset estimate;

dividing the sum by the number of Barker chips to form an estimate of the DC offset signal; and removing the DC estimate from a remaining chip term to produce a at least a first part of a Barker de-spread output with the DC offset signal removed.

11. The method of claim 10 wherein a second part of the Barker de-spread output is produced by:

operating on an equal number of positive and negative Barker chips;

using the first part and the second part of the Barker de-spread output to produce a total Barker de-spread output.

12. A communication receiver comprising:

a detection component configured to remove receiver induced direct current (DC) offset interference from a received signal;

a timing and carrier offset correction component coupled to the detection component;

a symbol recovery component coupled to the timing and carrier offset correction component, the symbol recover component configured to estimate a transmitted symbol by examining a frequency corrected signal with estimated transmitter-induced DC offset interference removed; and a transmitter DC estimation component coupled to the symbol recovery component, the transmitter DC estimation component configured to receive the estimated transmitted symbol and subtract the symbol to produce an estimate of the transmitter-induced DC offset interference.

13. The communication receiver of claim 12 further comprising a DC offset tracking component including:

a first register configured to operate with a first summer to receive DC offset estimates produced over a symbol and accumulate a plurality of DC offset estimates produced over N symbols;

a multiplier coupled to the register via a switch, the multiplier configured to average the accumulated DC offset estimates to produce an averaged DC offset estimate;

a second register configured to operate with a second summer to accumulate a plurality of averaged DC offset estimates received by the multiplier to determine an update; and a subtractor coupled to the second register, the subtractor configured to receive the accumulated averaged DC offset to complete a DC tracking loop.

14. The communication receiver of claim 12 wherein the detection component includes at least a Barker de-spread with DC estimation component and an estimated receiver DC averaging component.

15. The communication receiver of claim 12 wherein the detection component, the timing and carrier offset correction component, the symbol recovery component, and the transmitter DC estimation component are implemented digitally.

16. The communication receiver of claim 12 wherein data is encoded in the received signal as per the WLAN 802.11 wireless protocol.

17. A system for removing direct current (DC) interference from one or more signals received by a communication receiver, the system comprising:

means for estimating a DC offset signal induced by the communication receiver;

means for removing the estimated DC offset from the received signal;

means for correcting a frequency shift in the received signal;

means for estimating a second DC offset signal induced by a source of the received signal; and means for removing the estimated second DC offset from the received signal;

wherein the means for removing direct current (DC) interference from a received signal includes (a) means for operating on an equal number of positive and negative Barker chips to determine a sum of the DC offset estimate, (b) means for dividing the sum by the number of Barker chips to form an estimate of the DC offset signal, and (c) means for removing the DC estimate from a remaining chip term to produce a at least a first part of a Barker de-spread output with the DC offset signal removed.

18. The system of claim 17 wherein the estimated the DC offset signal is determined by:

means for calculating at least one sum of the received signal; and means for applying one or more functions to estimate the DC offset, the functions selected according to predetermined criteria and the sum of the received signals.

19. The system of claim 17 wherein the predetermined criteria includes cancellation of at least a portion of the received signal attributable to one or more transmitted chips.

20. The system of claim 17 wherein the receiver DC offset signal is estimated and removed prior to performing a timing carrier offset correction.

21. The system of claim 17 wherein a second part of the Barker de-spread output is produced via:

means for operating on an equal number of positive and negative Barker chips;

means for using the first part and the second part of the Barker de-spread output to produce a total Barker de-spread output.

22. The system of claim 17 wherein the DC offset signal is estimated by rearranging received Barker codes to separate the estimated DC signal from a de-spread Barker output.

23. A method for determining a direct current (DC) offset signal in a received symbol in a wireless communication system, the method comprising:

determining a sum of chips in the received symbol, the received symbol according to a complementary code keying (CCK) code; and isolating the DC offset signal by method as determined by the sum of the chips by (a) identifying one of a plurality of groups to which the received symbol belongs according to the sum of the chips; and (b) applying a function according to the identified group.

24. The method of claim 23 wherein the identifying one of the groups includes examining a remodulated symbol that represents an estimate of a sent signal.

25. The method of claim 23 wherein the function is independent of subtracting an estimated received symbol.

26. The method of claim 23 wherein the DC component is found by examining the chips of the remodulated symbol, the chips of the received symbol corresponding to the real ($+1/-1$) chips of the remodulated symbol being referred to as r1; and the chips of the received symbol corresponding to the imaginary ($+j/-j$) chips of the remodulated symbol being referred to as r2, the real and imaginary parts of the received chips, defined according to the r1 and r2 designations are organized as: r1=a1+jb1 and r2=a2+jb2.

27. The method of claim 26 wherein if the sum of the remodulated symbols yields (2+2j) or (−2−2j), a part of the DC is found using the equation:

$$\tfrac{1}{8}(\Sigma r1+\Sigma r2)=\tfrac{1}{8}[(\Sigma a1+\Sigma a2)+j(\Sigma b1+\Sigma b2)].$$

28. The method of claim 26 wherein if the sum of the remodulated symbols yields (2+2j) or (−2−2j), a part of the DC is found using the equation:

$$\tfrac{1}{8}j(\Sigma r1-\Sigma r2)=\tfrac{1}{8}[(\Sigma b1-\Sigma b2)+j(\Sigma a2-\Sigma a1)].$$

29. The method of claim 26 wherein if the sum of the remodulated symbols yields (2+2j) or (−2−2j), the DC components are found using the equation $$dc=\tfrac{1}{8}[(\Sigma a1+\Sigma a2+\Sigma b1-\Sigma b2)+j(\Sigma b1+\Sigma b2+\Sigma a2-\Sigma a1)].$$

30. The method of claim 26 wherein if the sum of the remodulated symbols yields (2−2j) or (−2+2j), a part of the DC is found using the equation:

$$\tfrac{1}{8}(\Sigma r1+\Sigma r2)+\tfrac{1}{8}[(\Sigma a1+\Sigma a2)+j(\Sigma b1+\Sigma b2)].$$

31. The method of claim 26 wherein if the sum of the remodulated symbols yields (2−2j) or (−2+2j), a part of the DC is found using the equation:

$$\tfrac{1}{8}j(\Sigma r1-\Sigma r2)+\tfrac{1}{8}[(\Sigma b2-\Sigma b1)+j(\Sigma a1-\Sigma a2)].$$

32. The method of claim 26 wherein if the sum of the remodulated symbols yields (2−2j) or (−2+2j), the DC components are found using the equation $$dc=\tfrac{1}{8}[(\Sigma a1+\Sigma a2+\Sigma b2-\Sigma b1)+j(\Sigma b1+\Sigma b2+\Sigma a1-\Sigma a2)].$$

\* \* \* \* \*